United States Patent
Park et al.

(10) Patent No.: US 8,351,947 B2
(45) Date of Patent: Jan. 8, 2013

(54) SYSTEM AND METHOD FOR RADIO ACCESS IN RECONFIGURABLE WIRELESS COMMUNICATION SYSTEM

(75) Inventors: Woo-Goo Park, Daejeon (KR); Sunhee Yang, Daejeon (KR); Jin-Up Kim, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 400 days.

(21) Appl. No.: 12/795,846

(22) Filed: Jun. 8, 2010

(65) Prior Publication Data

US 2011/0151857 A1    Jun. 23, 2011

(30) Foreign Application Priority Data

Dec. 17, 2009 (KR) .................. 10-2009-0126461

(51) Int. Cl.
*H04W 36/00* (2009.01)
(52) U.S. Cl. ..... 455/444; 455/443; 455/448; 455/432.2; 370/328
(58) Field of Classification Search .................. 455/444, 455/443, 448, 432.2; 370/328, 329, 335, 370/341, 342
See application file for complete search history.

(56) References Cited

U.S. PATENT DOCUMENTS

| | | | | |
|---|---|---|---|---|
| 6,510,146 | B1* | 1/2003 | Korpela et al. | 370/332 |
| 2006/0171332 | A1* | 8/2006 | Barnum | 370/254 |
| 2007/0097938 | A1* | 5/2007 | Nylander et al. | 370/338 |
| 2008/0020792 | A1* | 1/2008 | Falk et al. | 455/517 |
| 2008/0171552 | A1* | 7/2008 | Hyon et al. | 455/450 |
| 2009/0067367 | A1* | 3/2009 | Buracchini et al. | 370/328 |
| 2010/0008324 | A1* | 1/2010 | Lee et al. | 370/331 |
| 2010/0093340 | A1* | 4/2010 | Buracchini | 455/426.1 |
| 2010/0103873 | A1* | 4/2010 | Buracchini | 370/328 |
| 2010/0216468 | A1* | 8/2010 | Kazmi et al. | 455/435.3 |
| 2011/0026503 | A1* | 2/2011 | Mueck et al. | 370/338 |
| 2011/0103301 | A1* | 5/2011 | Mueck et al. | 370/328 |
| 2011/0130164 | A1* | 6/2011 | Sagae et al. | 455/517 |

FOREIGN PATENT DOCUMENTS

| | | |
|---|---|---|
| KR | 1020070069483 A | 7/2007 |
| KR | 1020080040655 A | 5/2008 |

OTHER PUBLICATIONS

Paul Houze et al., "Common Pilot Channel for network selection", IEEE 2006.*
Jordi et al., "A Novel On-Demand Cognitive Pilot Channel enabling Dynamic Spectrum Allocation", IEEE 2007.*
Annex 2 (to Annex 10 to Doc.5A/45) [Alcatel-Lucent France et al 141]; "R&D Activities concerning the Cognitive Radio Systems in the $E^2R$ and $E^3$ Projects", pp. 70-78, 2008 (exact date not given).
The $E^2R$ II Cognitive Pilot Channel (CPC), End to End Reconfigurability II ($E^2R$ II) White Paper, Nov. 2007 (exact date not given) pp. 26-43.

* cited by examiner

*Primary Examiner* — Kamran Afshar
*Assistant Examiner* — Mong-Thuy Tran
(74) *Attorney, Agent, or Firm* — Ladas & Parry LLP

(57) ABSTRACT

A system for radio access in a wireless communication system, in which a number of RATs exist, includes: a RAS configured to share radio environment information and the RATs with an adjacent RAS using a macroband SPC, the RAS being reconfigurable in conformity with the RATs; and a RMS configured to transmit/receive the radio environment information and the RATs to/from the RAS using a microband SPC and access the RAS using the microband SPC, the RMS being reconfigurable in conformity with RAT of the accessed RAS.

16 Claims, 7 Drawing Sheets

| self RASid | Adjacent RASid | operator | Frequency | RAT | CH.status | Traffic |
|---|---|---|---|---|---|---|
| RAS$_1$ | RAS$_1$ | O$_1$ | $f_1$ | RAT$_1$ | ch_sts | Traffic_sts |
| | | | $f_2$ | RAT$_2$ | ch_sts | Traffic_sts |
| | | O$_2$ | $f_3$ | RAT$_3$ | ch_sts | Traffic_sts |
| | | | $f_2$ | RAT$_2$ | ch_sts | Traffic_sts |
| | RAS$_2$ | O$_1$ | $f_1$ | RAT$_1$ | ch_sts | Traffic_sts |
| | | | $f_2$ | RAT$_2$ | ch_sts | Traffic_sts |
| | | O$_2$ | $f_3$ | RAT$_3$ | ch_sts | Traffic_sts |
| | | | $f_2$ | RAT$_2$ | ch_sts | Traffic_sts |

SYSTEM AND METHOD FOR RADIO ACCESS IN RECONFIGURABLE WIRELESS COMMUNICATION SYSTEM

CROSS-REFERENCE TO RELATED APPLICATIONS

The present application claims priority of Korean Patent Application No. 10-2009-0126461, filed on Dec. 17, 2009, which is incorporated herein by reference in its entirety.

BACKGROUND OF THE INVENTION

1. Field of the Invention

Exemplary embodiments of the present invention relate to a system and a method for radio access in a wireless communication system; and, more particularly, to a system and a method for radio access in a reconfigurable mobile communication system.

2. Description of Related Art

Various standards for wireless communication technologies have been established. Wireless networks have evolved from cell-based voice communication networks to those supporting high-speed wireless data transmission, and a number of standards coexist today. From the $3^{rd}$ generation network, which is being commercialized, $4^{th}$ generation standards are appearing, and technologies for the highest data processing rate are being developed.

The core concept of the $4^{th}$ generation network is as follows: every device uses an IP address, and the proposed network of a convergence type includes an IP-based core network and access networks based on various existing standards. The fact that these various standards operate in different bands restricts any approach to accommodate all future standards. In most cases, existing sensing frequency bands have a too wide range of 400 MHz to 6 GHz. Therefore, it takes a long sensing time to use a different system, and a large amount of power is consumed.

In an attempt to solve these problems, European research projects $E^2R$ and E3 propose a kind of common pilot channel, specifically a Cognition supporting Pilot Channel (CPC) for transferring radio channel occupation status to a mobile station. However, the CPC is based on broadcasting technology, and each access station is provided with multi-Radio Access Technology (RAT) information. This requires a supervising CPC control station for managing the RAT overall. In practice, a large number of CPC control stations are expectably necessary on a global scale, and a considerable amount of cost and time will be incurred. Therefore, there is a need for study to reduce special cost and complicated procedures.

SUMMARY OF THE INVENTION

An embodiment of the present invention is directed to a system and a method for radio access having compatibility with existing systems.

Another embodiment of the present invention is directed to a system and a method for radio access capable of increasing frequency efficiency.

Another embodiment of the present invention is directed to a system and a method for radio access capable of increasing the processing rate.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for radio access in a wireless communication system in which a number of Radio Access Technologies (RATs) exist, includes: a Reconfigurable Access Station (RAS) configured to share radio environment information and the RATs with an adjacent RAS using a macroband Super Pilot Channel (SPC), the RAS being reconfigurable in conformity with the RATs; and a Reconfigurable Mobile Station (RMS) configured to transmit/receive the radio environment information and the RATs to/from the RAS using a microband SPC and access the RAS using the microband SPC, the RMS being reconfigurable in conformity with RAT of the accessed RAS.

In accordance with another embodiment of the present invention, a method for radio access by a RAS in a wireless communication system in which a number of RATs exist, includes: sharing the RATs and radio environment information between the RAS and an adjacent RAS using a macroband SPC; and providing, by the RAS, the radio environment information and the RATs using a microband SPC ACK message when a RMS requests the RATs and the radio environment information using a microband SPC REQ message.

In accordance with another embodiment of the present invention, a method for radio access by a RMS in a wireless communication system in which a number of RATS exist, includes: transmitting, by the RMS, a request for radio environment information and the RATS to the RAS using a microband SPC REQ message after the RATs and the radio environment information are shared between RASs using a macroband SPC; and receiving the radio environment information and the RATs and selecting RAT using a microband SPC ACK message provided by the RAS in response to the request for the RATS and the radio environment information.

DESCRIPTION OF SPECIFIC EMBODIMENTS

Figure 1:
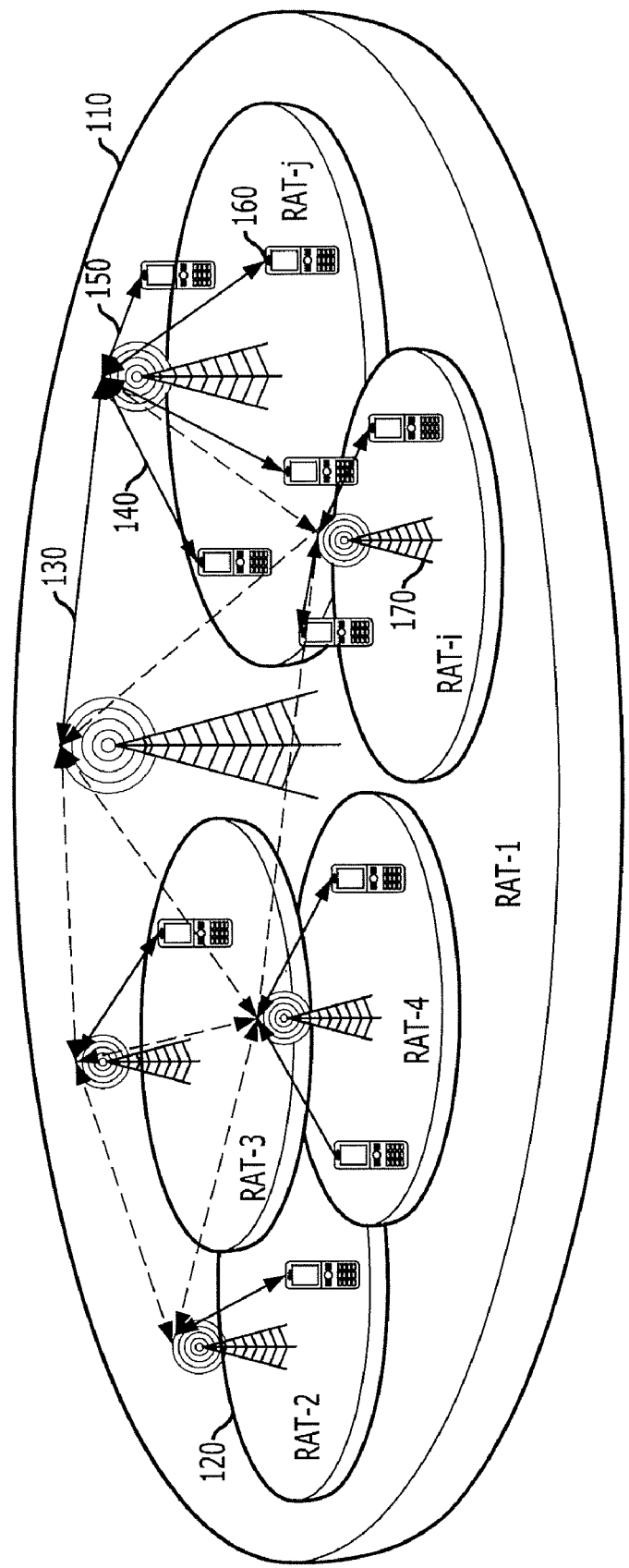
FIG. 1 briefly illustrates a method for radio access based on a SPC in a reconfigurable multi-RAT mobile communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In accordance with exemplary embodiments of the present invention, an optimum radio environment is recognized through interworking between Reconfigurable Access Stations (RASs) without using a separate channel, and based on the recognized radio environment information and data regarding Radio Access Technology (RAT), a Super Pilot Channel (SPC) is used through interworking with a Reconfigurable Mobile Station (RMS) to provide an optimum radio access environment satisfying Dynamic Spectrum Allocation (DSA) and Flexible Spectrum Management (FSM). The first RAS, which evolves to enable SPC-based multi-access, shares corresponding SPC information through broadcasting (macroband) to support radio environment sharing and reconfiguration of the RMS based on the sharing (microband). As used herein, "reconfigurable" means that a number of RATs are supported, and RMSs can be configured in conformity with each RAT. Such technology includes Cognitive Radio (CR)/Software Defined Radio (SDR) technology, etc.

An exemplary embodiment of the present invention will now be described with reference to the accompanying drawings.

FIG. 1 briefly illustrates a method for radio access based on a SPC in a reconfigurable multi-RAT mobile communication system in accordance with an embodiment of the present invention.

FIG. 1 shows RASs 170 configured to support RATs supported in respective cells, RMSs 160 configured to access the RASs and receive a service using the RATs, macroband SPCs 130 configured to exchange information regarding the RATs between the RASs, and microband SPCs 140 and 150 configured to perform access and control between the RASs and the RMSs. Each RAS supports RAT which is supported by a cell managed by the RAS itself. Respective RASs configured to transmit the macroband SPCs in FIG. 1 may be configured in a mesh type.

Various RATs are used in FIG. 1, and respective RATs have different cell radii. In the overlapping cell environment using RAT-1 110, respective RASs belonging to respective RATs (RAT-2, RAT-3, RAT-4, RAT-i, and RAT-j) use their own RATs. In a cell using RAT-2 120, the current RAT-1 can be used simultaneously (i.e. overlapping cell). For example, a WiBro cell capable of managing a wide range of networks may include a WLAN cell capable of managing small-scale networks.

A RMS 160 transmits an access request to an accessible RAM 170 using a microband SPC 140 and, when the access request is acknowledged, communication becomes possible. In order to enable this, the RAS in the center cell broadcasts RAT and radio environment information to RASs in adjacent cells using a macroband SPC 130 to share the radio environment information. Based on the information broadcasted using the macroband SPC 130, RMSs 160 access respective RASs in their cells using microband SPCs 150 and, when the access is acknowledged, communication becomes possible.

Figure 2:
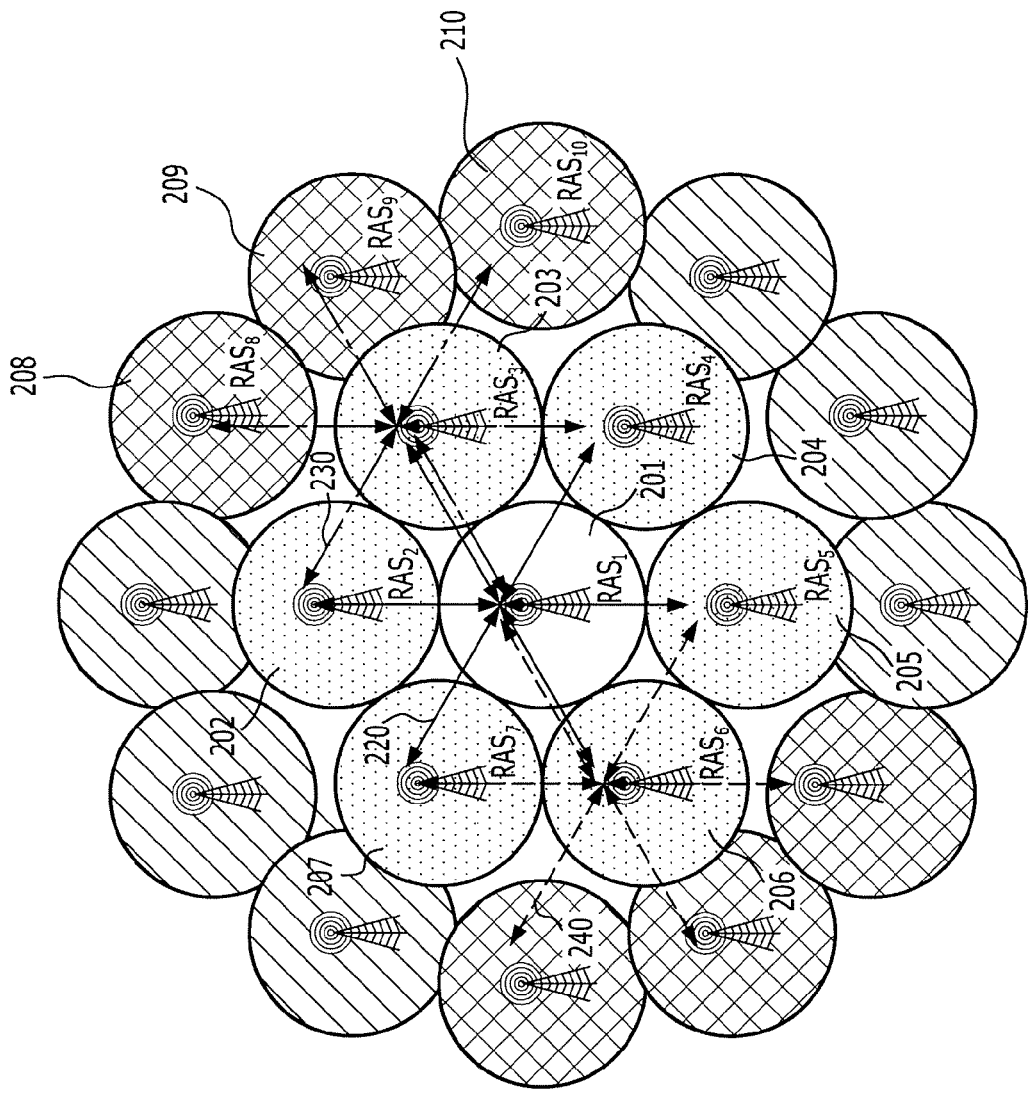
FIG. 2 illustrates arrangement of RASs and frequencies in accordance with an embodiment of the present invention.

FIG. 2 illustrates arrangement of RASs and frequencies in accordance with an embodiment of the present invention.

Each cell has a RAS at the center to manage the cell, each cell is surrounded by six adjacent cells having respective RASs, and each cell communicates with RMSs within the cell using a frequency having specific radio access environment. For example, a cell managed by $RAS_1$ 201 is surrounded by six adjacent cells managed by six RASs, specifically $RAS_2$ 202, $RAS_3$ 203, $RAS_4$ 204, $RAS_5$ 205, $RAS_6$ 206, and $RAS_7$ 207. Furthermore, a cell managed by $RAS_3$ 203 is surrounded by six adjacent cells managed by six RASs, specifically $RAS_1$ 201, $RAS_2$ 202, $RAS_4$ 204, $RAS_8$ 208, $RAS_9$ 209, and $RAS_{10}$ 210. The RASs of such center cells broadcast radio environment information using the macroband SPCs 220, 230, and 240 to share the radio environment information. For example, $RAS_3$ 203 is an adjacent cell of $RAS_1$ and receives radio environment information through the macroband SPC 220. However, when the $RAS_3$ 203 acts as a center cell, it broadcasts radio environment information to the RASs of its six adjacent cells, i.e. $RAS_1$ 201, $RAS_2$ 202, $RAS_4$ 204, $RAS_8$ 208, $RAS_9$ 209, and $RAS_{10}$ 210, through the macroband SPC 230 to share the radio environment information. Each unit cell has a first layer of cells, where influence is limited to an adjacent cell by adjusting power intensity without using different frequencies, and a second layer of cells, where a single frequency band is used to communicate with adjacent cells to avoid interference with cells beyond the adjacent cells. For example, the first layer of $RAS_1$ 201 includes $RAS_2$ 202, $RAS_3$ 203, $RAS_4$ 204, $RAS_5$ 205, $RAS_6$ 206, and $RAS_7$ 207, and the second layer thereof includes $RAS_8$ 208, $RAS_9$ 209, and $RAS_{10}$ 210.

Figure 3:
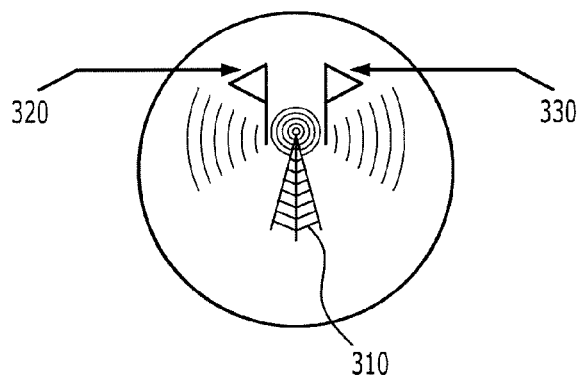
FIG. 3 illustrates frequency construction of a RAS in accordance with an embodiment of the present invention.

FIG. 3 illustrates frequency construction of a RAS in accordance with an embodiment of the present invention.

FIG. 3 shows a RAS 310, an antenna 320 belonging to the RAS and capable of transmitting a microband SPS, and an antenna 330 belonging to the RAS and capable of transmitting a macroband SPS.

The $i^{th}$ RAS 310 has two antennas 320 and 330 and two frequency bands corresponding to the two antennas. One frequency band is used to broadcast radio environment information to the $j^{th}$ (j>i) RAS in an adjacent cell using the antenna 330 which belongs to the RAS and which can transmit a macroband SPS. In addition, RMSs inside the $i^{th}$ RAS are provided with radio environment information regarding the center cell and adjacent cells using the antenna 320, which can transmit a microband SPS. The two antennas are configured to transmit/receive two different frequency bands, respectively, i.e. a macroband as a frequency band for broadcasting each radio environment information to the $j^{th}$ (j>i) RAS in an adjacent cell and a microband as a frequency band for providing RMSs inside the $i^{th}$ RAS with radio environment information regarding the center cell and adjacent cells.

Figure 4:
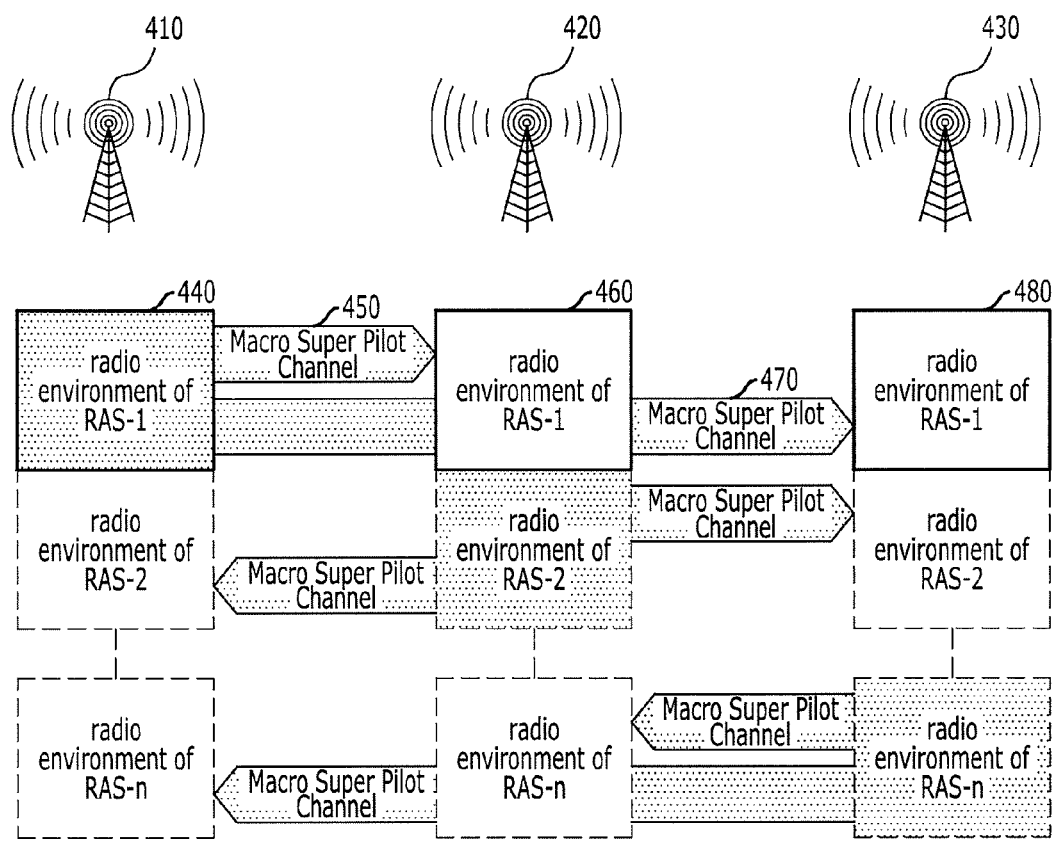
FIG. 4 illustrates construction of a macroband based on a macroband SPC of a RAS in accordance with an embodiment of the present invention.

FIG. 4 illustrates construction of a macroband based on a macroband SPC of a RAS in accordance with an embodiment of the present invention.

FIG. 4 shows RAS-1 410, RAS-2 420, RAS-3 430, storage spaces 440, 460, and 480 corresponding to respective RASs, and macroband SPCs 450 and 470 for transmitting/receiving radio environment information between the RASs.

The RAS-1 410 transmits radio environment information, which has been measured and stored in its storage space 440, to adjacent RASs including the RAS-2 420 using the macro SPC 450. The RAS-2 420 stores the radio environment information from the RAS-1 410 in its storage space 460 and, acting as a center RAS, transmits the information from the RAS-1 410 to RASs including the RAS-3 430 using the macro SPC 470. In a similar manner, the RAS-3 430 receives the radio environment information from the RAS-1 410 and stores the information in its storage space. The RAS-2 420 similarly transmits its radio environment information to RASs in adjacent cells, i.e. RAS-1 410 and RAS-3 430, which then store the radio environment information from the RAS-2 and, acting as center RASs, transmit radio environment information regarding the RAS-1 410 to RASs in adjacent cells.

Figure 5:
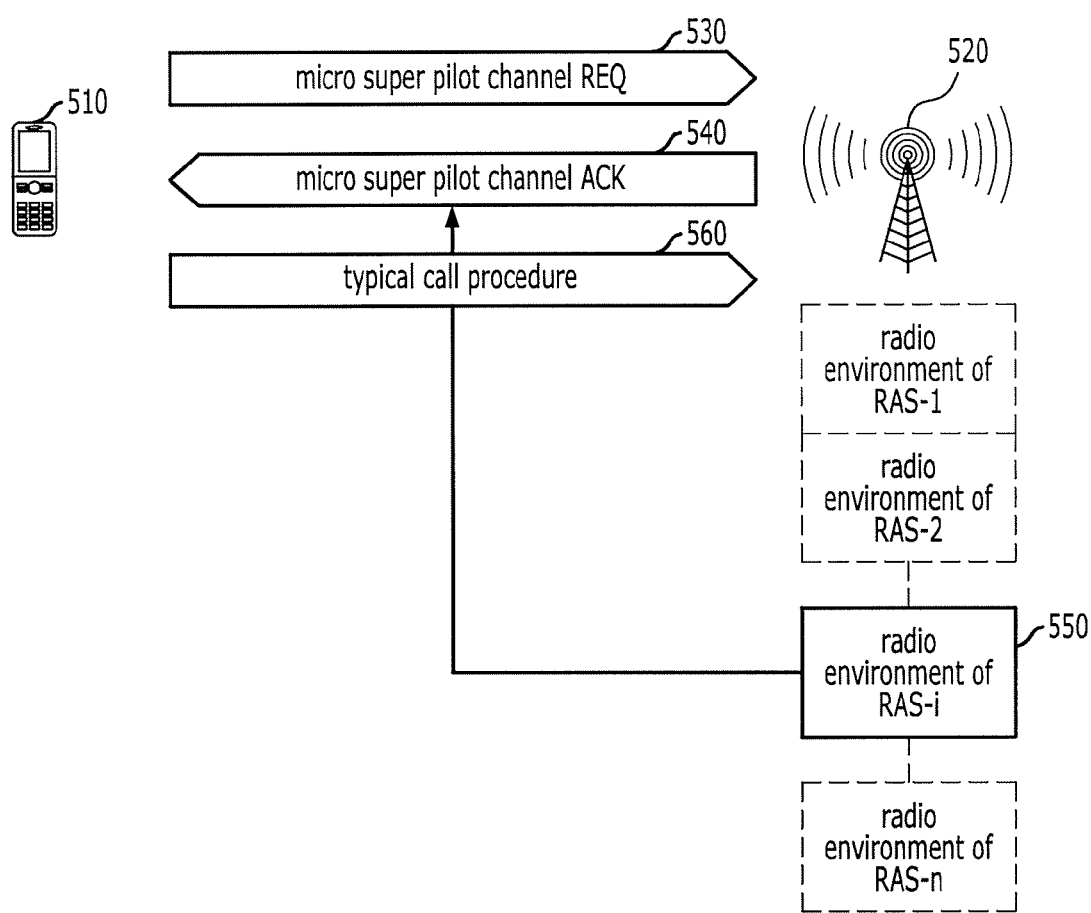
FIG. 5 illustrates construction of a microband based on a microband SPC between a RAS and a RMS in accordance with an embodiment of the present invention.

FIG. 5 shows construction of a microband based on a microband SPC between a RAS and a RMS in accordance with an embodiment of the present invention.

FIG. 5 shows a process of accessing RAS-i 520 by a RMS 510 using microband SPCs 530 and 540. It is assumed that RAS-1 520 supports RAT-1.

A RMS 510 existing inside a cell of RAT-1 transmits a microband SPC request (REQ) message 530, which is an in-band signal, to the RAS-i 520. The RAS-i 520 loads its radio environment information 550 onto a microband SPC acknowledgement (ACK) message 540 and transmits it to the RMS 510. The RMS 510 receives the radio environment information 550 from the RAS-1 520 and performs a typical call procedure 560.

Figure 6:
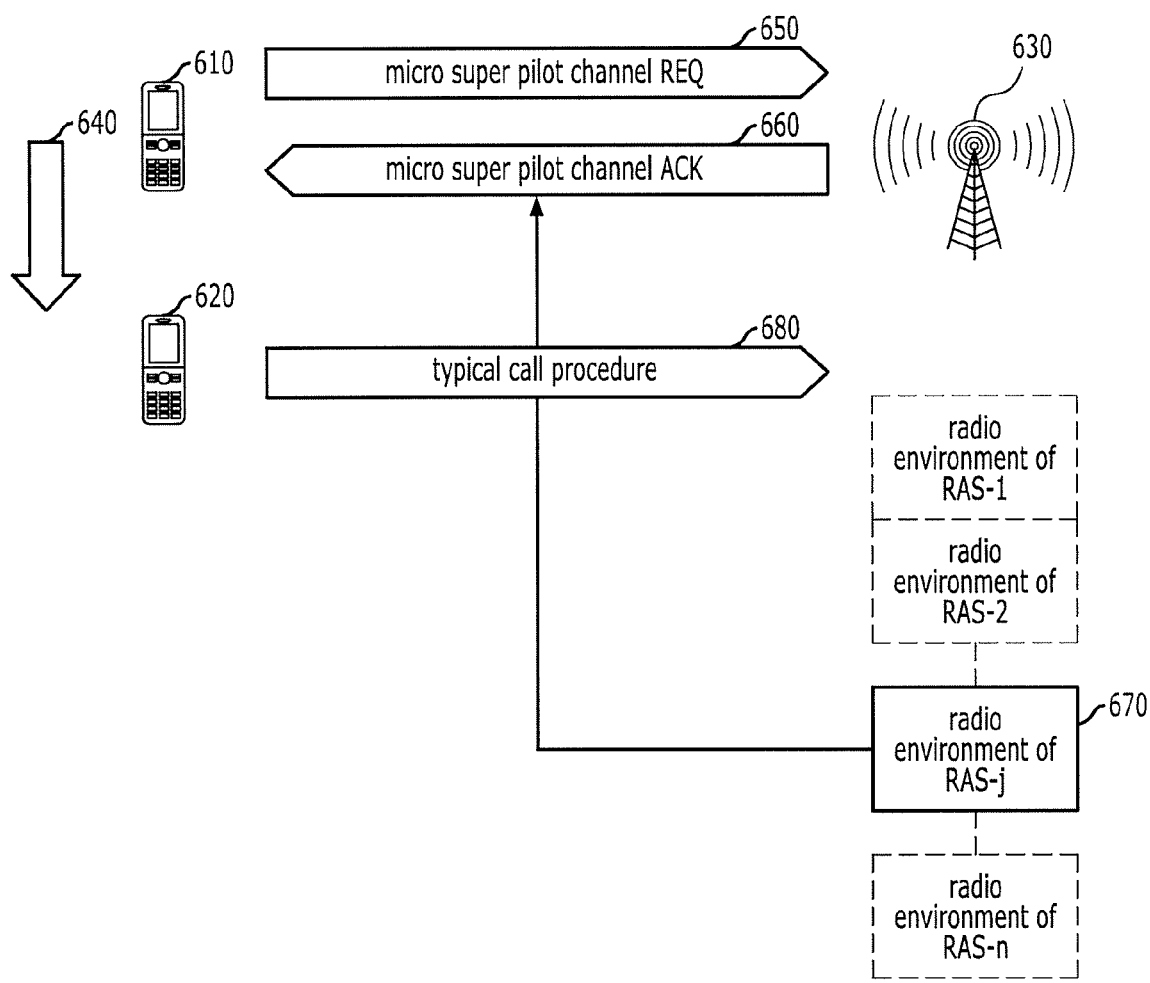
FIG. 6 illustrates construction for performing handover by exchanging adjacent channel information in accordance with an embodiment of the present invention.

FIG. 6 shows construction for performing handover by exchanging adjacent channel information in accordance with an embodiment of the present invention.

It is assumed in FIG. 6 that RAT-1 is supported by RAS-i 630, and RAT-2 is supported by RAS-j. A RMS 610 existing inside a cell of RAT-1 transmits a microband SPC REQ message 650, which is an in-band signal, to the RAS-i 630. The RAS-i 630 transmits its radio environment information as shown in FIG. 5, when the radio environment is favorable. However, when the radio environment is unfavorable, the RAS-i 630 checks the radio environment information 670 of an adjacent cell, which is more favorable. Then, the RAS-i 630 loads frequency (radio environment) information 670 of an adjacent cell (assumed to be RAS-j in FIG. 6), which is the most favorable, onto a microband SPC ACK message 660 and transmits it to the RMS 610 which has made the request. The RMS 610 receives the frequency (radio environment) information 670 regarding the RAS-j and changes it into RAT supported by the RAS-j at step S640. The RMS 620 moves to the RAS-j after the step S640, and performs a typical call procedure at step S680 according to the procedure of FIG. 5.

Figures 7, 8:
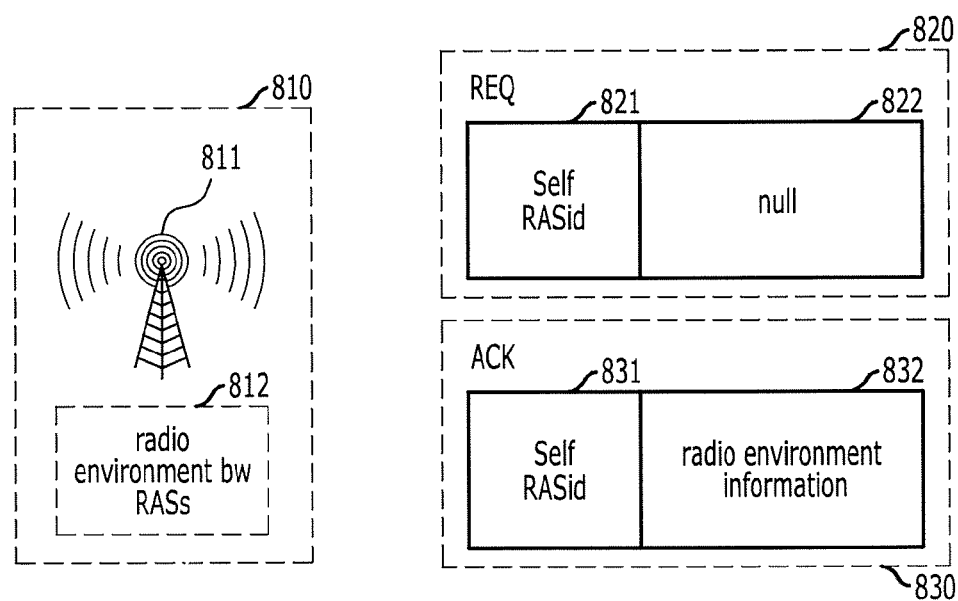
FIG. 7 illustrates structure of radio environment information of a RAS in accordance with an embodiment of the present invention.
FIG. 8 illustrates structure of a macroband SPC in accordance with an embodiment of the present invention.

FIG. 7 illustrates structure of radio environment information of a RAS in accordance with an embodiment of the present invention.

Referring to FIG. 7, each cell has its radio environment information map data, including a self RAS id field 710 containing its own RAS id, an adjacent RAS id field 720 containing the RAS id of adjacent cells, and an operator field 730 containing information regarding operators to which RASs belong. In addition, the frequency 740, radio access specification 750, channel status 760, and traffic status 770 are stored for respective operators to which RASs belong.

FIG. 8 illustrates structure of a macroband SPC in accordance with an embodiment of the present invention.

A macroband is similar to an out-band signal of a CPC. Reference numeral 810 refers to a signal for sharing RAS radio environment information between RASs, and includes an RAS 811 and radio environment information 812 transmitted between RASs. The radio environment information 812 includes a REQ message 820 and an ACK message 830. The REQ message 820 includes a RAS id field 821 and a null field 822. The REQ message 830 includes a RAS id field 831 and a radio environment information field 832. The RAS REQ message 820 of a transmitting RAS corresponds to a REQ signal 820 requesting radio environment information regarding the receiving RAS, and includes its self RAS id 821 and null data 822 for compatibility with an ACK signal. The ACK message 830 of the receiving RAS corresponds to an ACK signal in response to the REQ signal 820 of the transmitting RAS, and includes its self RAS id 831 and its radio environment information 832.

Figure 9:
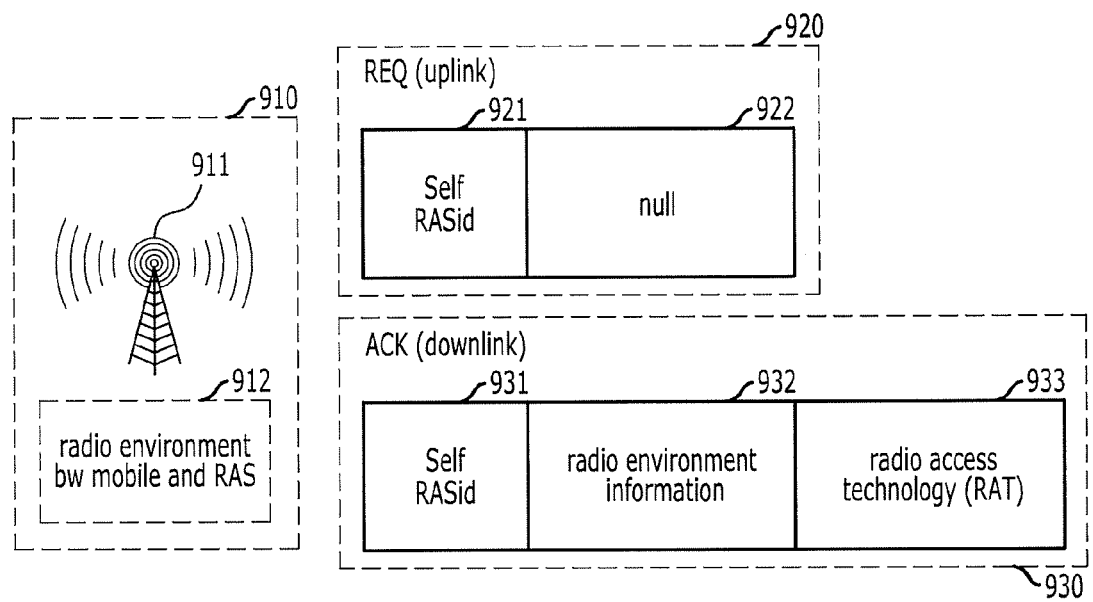
FIG. 9 illustrates structure of a microband SPC in accordance with an embodiment of the present invention.

FIG. 9 illustrates structure of a microband SPC in accordance with an embodiment of the present invention.

A microband is similar to an in-band signal of a CPC. Reference numeral 910 refers to a signal for transmitting/receiving optimum radio environment information between a RAS and a RMS when RASs share radio environment information regarding RASs, and includes a RAS 911 and radio environment information 912 transmitted between a RAS and a RMS. The radio environment information 912 includes a REQ message 920 and an ACK message 930. The REQ message 920 refers to a message transmitted from a RMS to a RAS through an uplink, and includes a RMS id field 921 and a null field 922. The ACK message 930 refers to a message transmitted from the RAS to the RMS, and includes a RAS id field 932, a radio environment information field 932, and a RAT field 933.

The REQ message 920 of the RMS corresponds to a REQ signal 920 requesting radio environment information regarding the RAS, and includes a self RMS id field 921 and null data 922 for compatibility with an ACK signal. The ACK message 930 of the RAS corresponds to an ACK signal in response to the REQ signal 920 of the RMS, and includes its self RAS id 931, its radio environment information 932, and optimum RAT information 933.

The system and method for radio access in accordance exemplary embodiments of the present invention have compatibility with existing systems and can increase the frequency efficiency and processing rate.

While the present invention has been described with respect to the specific embodiments, it will be apparent to those skilled in the art that various changes and modifications may be made without departing from the spirit and scope of the invention as defined in the following claims.

What is claimed is:

1. A system for radio access in a wireless communication system in which a number of Radio Access Technologies (RATs) exist, comprising:
   a Reconfigurable Access Station (RAS) configured to share radio environment information and the RATs with an adjacent RAS using a macroband Super Pilot Channel (SPC), the RAS being reconfigurable in conformity with the RATS; and
   a Reconfigurable Mobile Station (RMS) configured to transmit/receive the radio environment information and the RATs to/from the RAS using a microband SPC and access the RAS using the microband SPC, the RMS being reconfigurable in conformity with RAT of the accessed RAS.

2. The system of claim 1, wherein the RAS and the adjacent RAS can be configured as a mesh network.

3. The system of claim 1, wherein the adjacent RAS is configured to receive the RATs and the radio environment information from the RAS and provide an adjacent RAS of the adjacent RAS with the RATs and the radio environment information from the RAS.

4. The system of claim 1, wherein the radio environment information comprises a self RAS id field containing id of the RAS, an adjacent RAS id field containing id of the adjacent RAS, an operator field containing information regarding an operator of the RAS, a frequency field containing information regarding frequency for each operator, a radio access specification field containing information regarding RAT for each frequency, a channel status field containing information regarding channel status of the radio access specification, and a traffic status field containing traffic status of the channel.

5. A method for radio access by a Reconfigurable Access Station (RAS) in a wireless communication system in which a number of Radio Access Technologies (RATs) exist, comprising:
   sharing the RATs and radio environment information between the RAS and an adjacent RAS using a macroband Super Pilot Channel (SPC); and
   providing, by the RAS, the radio environment information and the RATs using a microband SPC ACK message when a Reconfiqurable Mobile Station (RMS) requests the RATs and the radio environment information using a microband SPC REQ message.

6. The method of claim 5, wherein the adjacent RAS receives the RATs and the radio environment information from the RAS and provides an adjacent RAS of the adjacent RAS with the RATS and the radio environment information from the RAS.

7. The method of claim 5, wherein the macroband SPC comprises:
   a macroband SPC REQ message transmitted to the adjacent RAS by the RAS, the macroband SPC REQ message comprising a self RAS id field containing information regarding the RAS and a null field for compatibility with an ACK message received from the adjacent RAS; and
   a macroband SPC ACK message transmitted to the RAS by the adjacent RAS, the macroband SPC ACK message comprising a self RAS id field containing information regarding the adjacent RAS and a radio environment information field containing the radio environment information.

8. The method of claim 5, wherein the microband SPC REQ message comprises:
   a self RMS id field containing information regarding the RMS; and
   a null field corresponding to the ACK message transmitted from the RAS.

9. The method of claim 5, wherein the microband SPC ACK message comprises:
   a self RAS id field containing information regarding the RAS;
   a radio environment information field containing the radio environment information; and
   a RAT field containing the RATS.

10. The method of claim 5, wherein the radio environment information comprises a self RAS id field containing id of the RAS, an adjacent RAS id field containing id of the adjacent RAS, an operator field containing information regarding an operator of the RAS, a frequency field containing information regarding frequency for each operator, a radio access specification field containing information regarding RAT for each frequency, a channel status field containing information regarding channel status of the radio access specification, and a traffic status field containing traffic status of the channel.

11. A method for radio access by a Reconfigurable Mobile Station (RMS) in a wireless communication system in which a number of Radio Access Technologies (RATs) exist, comprising:
   transmitting, by the RMS, a request for radio environment information and the RATs to a Reconfigurable Access Station (RAS) using a microband Super Pilot Channel (SPC) REQ message after the RATs and the radio environment information are shared between RASs using a macroband SPC; and
   receiving the radio environment information and the RATs and selecting RAT using a microband SPC ACK message provided by the RAS in response to the request for the RATs and the radio environment information.

12. The method of claim 11, wherein the adjacent RAS receives the RATs and the radio environment information from the RAS and provides an adjacent RAS of the adjacent RAS with the RATs and the radio environment information from the RAS.

13. The method of claim 11, wherein the macroband SPC comprises:
   a macroband SPC REQ message transmitted to the adjacent RAS by the RAS, the macroband SPC REQ message comprising a self RAS id field containing information regarding the RAS and a null field for compatibility with an ACK message received from the adjacent RAS; and
   a macroband SPC ACK message transmitted to the RAS by the adjacent RAS, the macroband SPC ACK message comprising a self RAS id field containing information regarding the adjacent RAS and a radio environment information field containing the radio environment information.

14. The method of claim 11, wherein the microband SPC REQ message comprises:
   a self RMS id field containing information regarding the RMS; and
   a null field corresponding to the ACK message transmitted from the RAS.

15. The method of claim 11, wherein the microband SPC ACK message comprises:
   a self RAS id field containing information regarding the RAS;
   a radio environment information field containing the radio environment information; and
   a RAT field containing the RATS.

16. The method of claim 11, wherein the radio environment information comprises a self RAS id field containing id of the RAS, an adjacent RAS id field containing id of the adjacent RAS, an operator field containing information regarding an operator of the RAS, a frequency field containing information regarding frequency for each operator, a radio access specification field containing information regarding RAT for each frequency, a channel status field containing information regarding channel status of the radio access specification, and a traffic status field containing traffic status of the channel.

* * * * *